United States Patent [19]

Röhm

[11] Patent Number: 4,645,387

[45] Date of Patent: Feb. 24, 1987

[54] DRILL CHUCK FOR TAPPING AND DRILLING

[76] Inventor: Günter H. Röhm, Heinrich-Röhm-Str. 50, 7927 Sonthei, Fed. Rep. of Germany

[21] Appl. No.: 783,763

[22] Filed: Oct. 3, 1985

[30] Foreign Application Priority Data

Oct. 6, 1984 [DE] Fed. Rep. of Germany ... 8429380[U]

[51] Int. Cl.$^4$ .............................................. B23B 39/14
[52] U.S. Cl. .................................... 408/127; 279/16; 279/62; 408/240
[58] Field of Search ............................ 279/61, 62, 16; 408/127, 240

[56] References Cited

U.S. PATENT DOCUMENTS

| 2,416,586 | 2/1947 | Jones | 279/16 |
| 2,508,459 | 5/1950 | Hoffsommer | 279/16 |
| 2,767,564 | 10/1956 | Green | 279/16 |
| 4,274,314 | 6/1981 | Repinski | 279/16 |

*Primary Examiner*—John Sipos
*Attorney, Agent, or Firm*—Karl F. Ross; Herbert Dubno

[57] ABSTRACT

A chuck has a rear chuck part centered on a rear axis and adapted to be secured to the spindle of a drill for rotation about the rear axis, a front chuck part centered on a front axis, and a universal joint interconnecting the two parts for joint rotation about the rear axis with the front axis movable between a position on the rear axis and a position with the front axis intersecting and skew, that is nonparallel, to the rear axis. Jaws on the front chuck part can be radially displaced thereon relative to the front axis to clamp a tool—a tap or drill bit—at the front axis in the front part. A locking element carried on one of the parts is engageable with the other part for holding the parts with the axes coaxial and nondisplaceable relative to each other.

6 Claims, 1 Drawing Figure

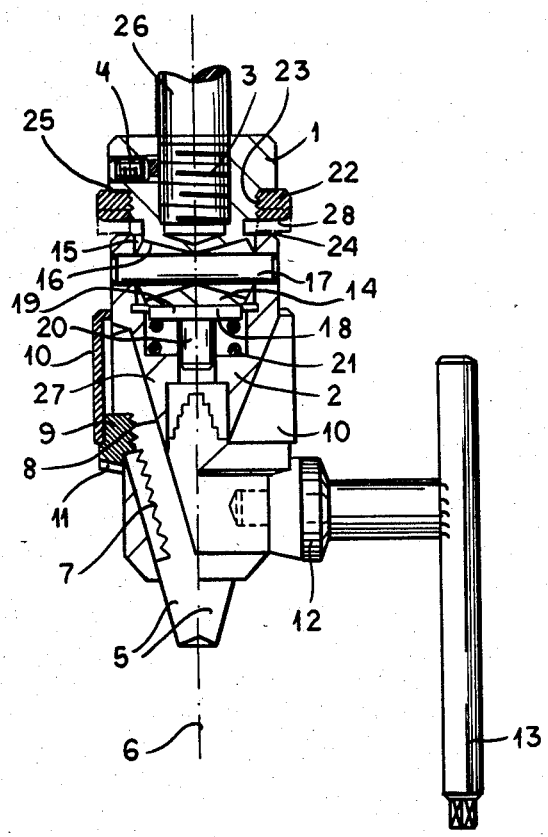

DRILL CHUCK FOR TAPPING AND DRILLING

FIELD OF THE INVENTION

The present invention relates to a drill chuck. More particularly this invention concerns such a chuck provided with a swivel for tapping preformed holes.

BACKGROUND OF THE INVENTION

A standard drill chuck has a chuck body comprised of one part formed with a frustoconical surface centered on the chuck axis and another part axially displaceable relative thereto and forming an abutment surface generally perpendicular to the chuck axis. Three angularly equispaced jaws are axially braced between the centering and abutment surfaces and are urged radially apart by springs. The two parts are threaded together so the surfaces can be axially relatively displaced, thereby radially displacing the jaws. To hold a tool, the parts are relatively rotated to separate the surfaces and spread the jaws, the shank of the tool is placed between the spread jaws, and the parts are oppositely relatively rotated to clamp them on the shank of the tool.

When such an arrangement is used for drilling, the chuck body is threaded onto the rotary spindle of the drill transmission so that the drill bit held between the jaws is centered on and rotated about the chuck axis. When, however, the chuck is used to hold a tap for threading predrilled holes, a cardan or universal joint permitting limited displacement of the drill axis relative to the spindle axis is provided in a two-part chuck body so that the tap held in the chuck can center itself in the predrilled hole. In, for instance, a production setup with a drill-press arrangement for tapping predrilled holes such an arrangement makes it irrelevant if the spindle axis is slightly out of line with the hole axis, whereas without the cardan joint the hole would be tapped off-center.

It is therefore necessary to dispose of two different chuck assemblies to use the same piece of equipment both for tapping and for drilling. The limited swiveling of the tapping chuck makes it unusable for accurately drilling holes, while the inability to swivel makes the drilling chuck unsuitable for tapping predrilled holes.

OBJECTS OF THE INVENTION

It is therefore an object of the present invention to provide an improved drill chuck.

Another object is the provision of such a drill chuck which overcomes the above-given disadvantages, that is which can be used both for drilling and for tapping predrilled holes.

SUMMARY OF THE INVENTION

A chuck according to the invention has a rear chuck part centered on a rear axis and adapted to be secured to the spindle of a drill for rotation about the rear axis, a front chuck part centered on a front axis, and a universal joint interconnecting the two parts for joint rotation about the rear axis with the front axis movable between a position on the rear axis and a position with the front axis intersecting and skew, that is nonparallel, to the rear axis. Jaws on the front chuck part can be radially displaced thereon relative to the front axis to clamp a tool at the front axis in the front part. According to this invention a locking element carried on one of the parts is engageable with the other part for holding the parts with the axes coaxial and nondisplaceable relative to each other.

Thus with the system of this invention the chuck can be used both for tapping and for drilling. When the locking element is engaged with the other part it eliminates the possibility of the two parts swiveling relative to each other and makes the assembly suitable for drilling. When backed off it allows such swiveling.

According to this invention the element is a ring threaded on the one part and axially engageable with the other part. The one part is formed with an external screwthread carrying the ring and centered on the respective axis. This makes it possible to use a fine thread and a large-diameter ring to bring considerable axial force to bear to prevent relative tipping of the two parts.

In accordance with another feature of this invention the one part has a surface against which the ring is engageable when not engaged with the other part. Thus the vibration of the chuck during tapping will not loosen the locking element and unintentionally lock up the chuck.

DESCRIPTION OF THE DRAWING

The above and other features and advantages will become more readily apparent from the following, reference being made to the accompanying drawing whose sole figure is an axial section through the chuck according to this invention.

SPECIFIC DESCRIPTION

As seen in the drawing the chuck assembly according to this invention is generally centered on an axis 6 and is usually carried on the threaded tip of a drill spindle 26. The chuck has a two part body comprised of an axial rear part 1 secured by a lock screw 4 on the spindle 26 and a front part 2 formed with inclined guides 27. A front ring 9 can rotate about the axis 6 on the part 2 but that cannot move axially thereon. Three jaws 5 angularly equispaced about the axis 6 ride in the inclined guides 27 and have outer edges formed with teeth 7 that mesh with an inner screwthread 8 of the ring 9. A gear 12 of a chuck key 13 can mesh as is known per se with teeth 11 of the ring 9 to rotate it about the axis 6, and this ring 9 is provided with an axially rearwardly extending sleeve 10 permitting it to be manually rotated.

For use in tapping, where the tap held by the jaws 5 must be able to align with an axis that might be offset from the spindle axis 6, the parts 1 and 2 are connected together by a cardan joint 14–17. To this end the part 1 has a head 14 received in an axially centered and axially rearwardly open recess 15 of the part 2, the fit inhibiting any relative purely radial movement of the parts 1 and 2 at the joint. The head 14 is formed with a diametrally doubly flared bore 16 through which passes a pin 17 extending diametrally through the axis 6 and having ends seated in the part 2. Thus this pin 17 permits limited relative movement of the two parts 1 and 2 about the axis of the pin 17 as well as about an axis perpendicular thereto and to the axis 6. This is generally standard in a universal joint.

In addition the head 14 has a front end 18 that is planar and perpendicular to the axis 6. A pin 20 axially slidable in the part 2 has a flat head 19 that can flatly engage against this end surface 18 and is urged axially backward by a spring 21. Thus this spring 21 serves to coaxially align the parts 1 and 2 while still permitting them to tip somewhat relative to each other, as is necessary when tapping predrilled holes.

According to this invention the above-described chuck can be used for standard drilling, with no misalignment of the axis of the part 2 relative to the part 1 possible. To this end the part 1 is provided with an external thread 23 meshing with the complementary internal thread of a ring 22 having a flat front face 28 that can engage flatly against a flat back face 24 of the part 2. When this ring 22 is screwed forward on the part 1 from the solid-line position to the dot-dash position it therefore completely and effectively inhibits relative tipping of the two parts 1 and 2. The screwthread 23 is fine so the ring 22 can be screwed very tightly against the part 2.

When used for tapping the ring 22 is screwed back into the solid-line position in which case it bears against and secures itself on a surface 25 of a shoulder of the part 1. Thus the ring 22 will not shake loose when back out of the way of the part 2.

The chuck according to this invention can therefore be used for tapping and for drilling. Changeover is a simple manual task, and the extra expense of the locking element constituted by the ring 22 is nominal.

I claim:

1. A chuck comprising:
   a rear chuck part centered on a rear axis and adapted to be secured to the spindle of a drill for rotation about the rear axis;
   a front chuck part centered on a front axis, one of the parts being formed with a screwthread centered on the respective axis and the other part having an annular face perpendicular to and centered on the respective axis and turned toward the one chuck part said annular face being integral with and fixed relative to said other part and spaced from the screwthread of said one part;
   means including a universal joint interconnecting the two parts for joint rotation about the rear axis with the front axis movable between a position on the rear axis and a position with the front axis intersecting and skew to the rear axis;
   jaws on the front chuck part
   means on the front chuck part for radially displacing the jaws relative to the front axis thereon and thereby clamping a tool at the front axis in the front part; and
   a locking ring threaded on the screwthread of the one part and having an end face centered on and perpendicular to the respective axis and confronting the annular face of the other part, the end face of the ring being flatly engageable with the annular face of the other part for holding the parts with the axes coaxial and nondisplaceable relative to each other.

2. The chuck defined in claim 1 wherein the one part has a surface against which the ring is engageable when not engaged with the other part.

3. The chuck defined in claim 2 wherein the one part is the rear part.

4. The chuck defined in claim 1 wherein both faces are planar.

5. The chuck defined in claim 4 wherein both parts and the ring are formed of metal and the two parts are unitary with the respective faces, whereby when the two faces are screwed together the two parts are forced to be coaxial.

6. A chuck comprising:
   a rear chuck part centered on a rear axis, formed with an external screwthread centered on the axis, and adapted to be secured to the spindle of a drill for rotation about the rear axis;
   a front chuck part centered on a front axis and having an annular and planar face perpendicular to and centered on the respective axis and turned toward the rear chuck part said annular face being integral with and fixed relative to said front part and spaced from the screwthread of said rear part;
   means including a universal joint interconnecting the two parts for joint rotation about the rear axis with the front axis movable between a position on the rear axis and a position with the front axis intersecting and skew to the rear axis;
   jaws on the front chuck part:
   means on the front chuck part for radially displacing the jaws relative to the front axis thereon and thereby clamping a tool at the front axis in the front part; and
   a locking ring threaded on the screwthread of the rear part and having a planar end face centered on and perpendicular to the respective axis and confronting the annular face of the front part, the ring being axially movable by rotation in the threads between a back position with the two faces spaced and front axis swivelable on the rear part and a closed position with the two faces abutting flatly and the two axes relatively fixed and coaxial.

* * * * *